United States Patent [19]

Slivon et al.

[11] Patent Number: 5,407,170
[45] Date of Patent: Apr. 18, 1995

[54] LOCKABLE EQUIPMENT HANGER ASSEMBLY

[75] Inventors: George R. Slivon; Ronald J. Kirsch; Charles H. Heiligenthal, all of Kenosha, Wis.

[73] Assignee: Snap-on Incorporated, Kenosha, Wis.

[21] Appl. No.: 904,162

[22] Filed: Jun. 25, 1992

[51] Int. Cl.6 ............................................. F16M 13/00
[52] U.S. Cl. ........................................ 248/552; 211/7; 211/70.1; 248/213.2; 248/304
[58] Field of Search ............... 211/4, 7, 8, 70.6, 70.7, 211/70.1, 66, 60.1, 59.1; 248/551, 552, 553, 215, 213.2, 339, 340, 304, 300, 303

[56] References Cited

U.S. PATENT DOCUMENTS

| | | | |
|---|---|---|---|
| 742,507 | 10/1903 | Simmons | 211/4 X |
| 919,896 | 4/1909 | Lemke | 248/300 |
| 1,822,037 | 9/1931 | Kerschner | 248/300 |
| 2,420,425 | 5/1947 | Hardwick | 248/300 |
| 2,572,797 | 10/1951 | Zimmer | 211/70.6 X |
| 2,616,133 | 11/1952 | Peters | 211/4 |
| 2,693,691 | 11/1954 | Pasanen . | |
| 2,805,777 | 9/1957 | Larson | 211/70.1 |
| 2,974,804 | 3/1961 | Maro | 211/70.6 |
| 3,606,711 | 9/1971 | Lodato | 248/215 X |
| 3,768,662 | 10/1973 | Ritzen | 211/4 |
| 3,791,709 | 2/1974 | Cross | 248/300 X |
| 3,797,284 | 3/1974 | Grossman | 211/4 X |
| 3,884,055 | 5/1975 | Vuillemot . | |
| 3,918,588 | 11/1975 | Walser et al. | 248/215 X |
| 4,038,843 | 8/1977 | Daley, Jr. . | |
| 4,081,978 | 4/1978 | Ivey . | |
| 4,093,168 | 6/1978 | Buril | 248/300 X |
| 4,139,100 | 2/1979 | Reed | 211/4 |
| 4,155,458 | 5/1979 | Moline | 211/59.1 X |
| 4,462,497 | 7/1984 | Maule | 211/7 |
| 4,489,837 | 12/1984 | Adair . | |
| 4,562,707 | 1/1986 | Graham, III . | |
| 4,606,466 | 8/1986 | Fredrickson | 211/59.1 |
| 4,817,401 | 4/1989 | Cohodar . | |
| 4,889,307 | 12/1989 | Klonsek | 248/303 X |
| 4,971,279 | 11/1990 | George | 248/340 X |

FOREIGN PATENT DOCUMENTS 395457 12/1965 Switzerland ..................... 248/215

Primary Examiner—Ramon O. Ramirez
Assistant Examiner—Korie H. Chan
Attorney, Agent, or Firm—Emrich & Dithmar

[57] ABSTRACT

A hanger assembly includes a one-piece sheet metal bracket with a channel-shaped flange for hooking over the upper edge of the side wall of an associated cabinet. The bracket has a forwardly projecting, elongated channel formed therein and extending the length thereof with a plurality of holes therethrough for receiving the threaded ends of hook-like hanger members, which are fastened by nuts. The distal ends of the hooks have apertures therethrough. The hooks may be received through complementary openings in associated equipment, such as a creeper. Hanging articles are retained in place by a retaining rod having one end receivable through an aperture in one hook and having an eyelet at the other end for receiving the distal end of another hook. A padlock shackle may be received through the aperture in the other hook to lock the retaining rod in place. Various numbers of hooks may be mounted on the bracket in a variety of spacings and arrangements.

12 Claims, 2 Drawing Sheets

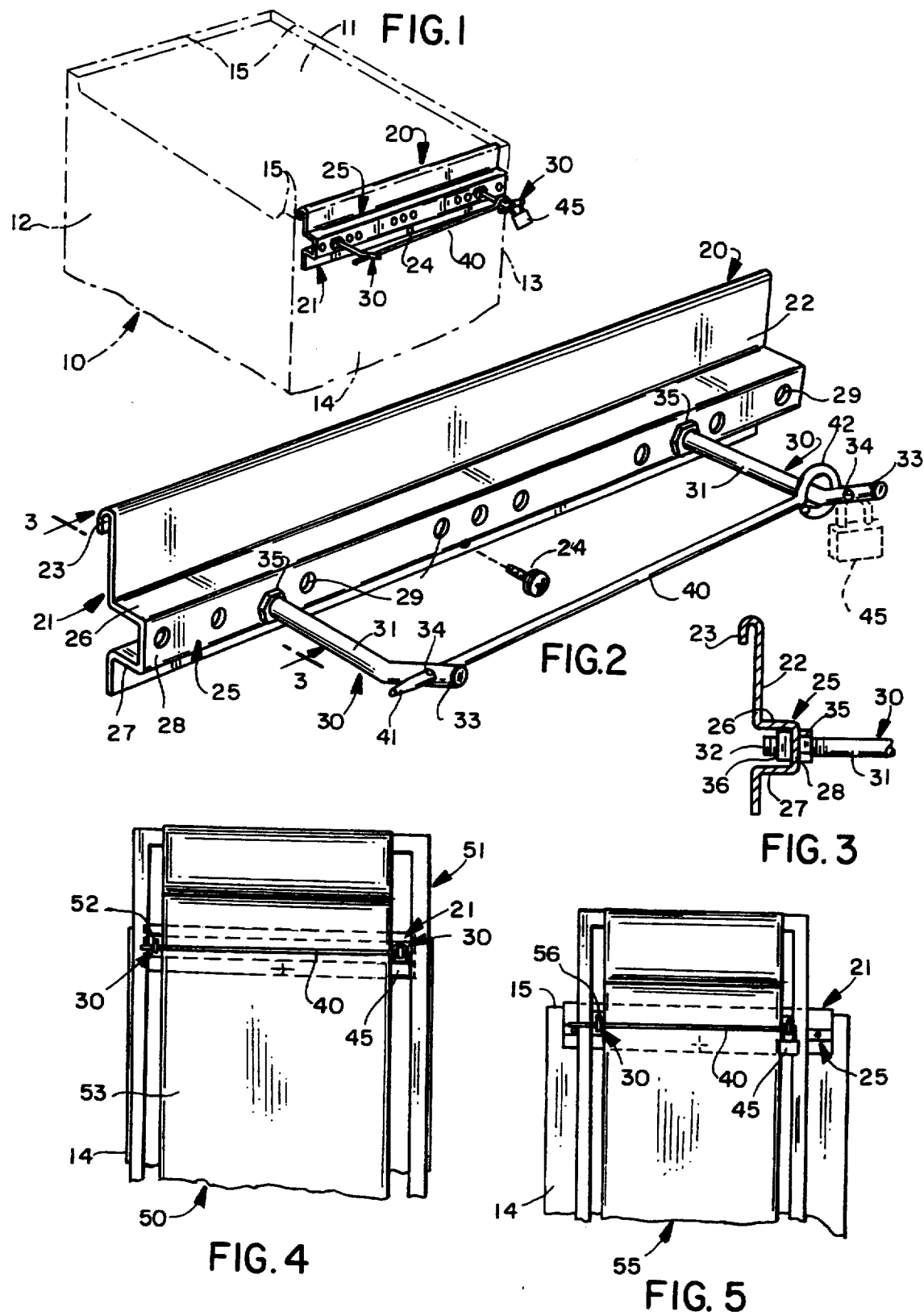

LOCKABLE EQUIPMENT HANGER ASSEMBLY

BACKGROUND OF THE INVENTION

1. Field of the Invention

The present invention relates to accessory support arrangements for supporting accessory tools, equipment and the like on associated structure, such as a tool cabinet or the like.

2. Description of the Prior Art

Automotive mechanics in repair shops commonly keep their tools in a portable tool chest or cabinet. Such cabinets may be quite large and are commonly mounted on casters or rollers so that they can readily be moved about the floor of the workplace. Such tool chests typically include a plurality of drawers of varying sizes for accommodating different types and sizes of tools and associated equipment for use in automotive diagnosis and repair.

But the mechanic may also use a number of other tools, equipment and other accessories, which either cannot readily be stored in the drawers of the tool cabinet because of their size or shape and/or are so frequently used that the mechanic wishes to have them readily accessible without having to open a drawer to gain access to them. Such accessory items may include devices such as cables, cords, goggles, welding helmets, large wrenches, air hoses, hammers, mallets and similar items. Another piece of equipment commonly used by a mechanic for working under a vehicle is a "creeper", which is a flat panel or pad supported on small wheels or casters on which the mechanic can recline for rolling about beneath the vehicles. It is desirable to have a place to store the creeper and the other types of accessory items described above. Furthermore, it is desirable to have some means for securing or locking these accessory items in their stowed or stored location.

It is known to provide an accessory support apparatus for mounting on the outside of a tool chest or cabinet, one such arrangement being disclosed in U.S. Pat. No. 4,489,837. But that arrangement includes a large utility bin and a large number of sheet metal parts which must be assembled together. Furthermore, it does not provide any means for locking accessory items supported thereon.

SUMMARY OF THE INVENTION

It is a general object of the invention to provide an improved storage apparatus for storing accessory items, which avoids the disadvantages of prior storage arrangements while affording additional structural and operating advantages.

An important feature of the invention is the provision of a hanger apparatus which permits accessory articles to be hung on the outside of an associated support structure, such as a tool cabinet or the like.

In connection with the foregoing feature, another feature of the invention is the provision of a hanger apparatus of the type set forth, which can be readily mounted and demounted on the associated support structure.

Another feature of the invention is the provision of a hanger apparatus of the type set forth which is of simple and economical construction.

Still another feature of the invention is the provision of a hanger apparatus of the type set forth which is lockable for securing hanging articles thereon.

These and other features of the invention are attained by providing hanger apparatus comprising: a support bracket adapted to be mounted on an associated support structure, the bracket including an elongated channel-shaped mounting portion having a plurality of openings therein spaced-apart longitudinally thereof, at least one hanger member extending through a selected one of the openings in the bracket and projecting therefrom, and fastening means securely attaching the hanger member to the bracket.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a perspective view of a hanger apparatus constructed in accordance with the present invention and illustrated in its mounted configuration on an associated tool cabinet which is illustrated fragmentarily in phantom;

FIG. 2 is an enlarged perspective view of the hanger apparatus of FIG. 1;

FIG. 3 is a view in vertical section taken along the line 3—3 in FIG. 2;

FIG. 4 is a front elevational view of the hanger apparatus of FIG. 1 shown mounted on an associated tool cabinet illustrated fragmentarily, and depicting, in fragmentary form, an associated creeper supported on the hanger apparatus;

FIG. 5 is a view similar to FIG. 4, showing a different arrangement of the hooks of the hanger apparatus for supporting a different-sized creeper;

DESCRIPTION OF THE PREFERRED EMBODIMENT

Figure 6:
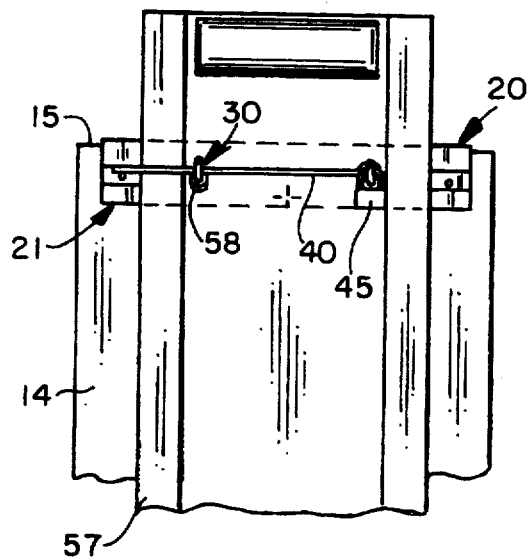
FIG. 6 is a view similar to FIG. 4, illustrating a further configuration of the hanger apparatus for mounting a different type of creeper.

Referring to FIG. 1, there is illustrated a tool cabinet, generally designated by the numeral 10, of the type with which the present invention may be used. The cabinet 10 includes a top wall 11 interconnecting front and rear walls 12 and 13 and a pair of opposed side walls 14. At least the rear wall 13 and the side walls 14 have a raised upper edge 15 which projects a slight distance above the level of the top wall 11.

Referring also to FIGS. 2 and 3, there is illustrated a hanger assembly 20 constructed in accordance with the present invention. The hanger assembly 20 includes a sheet metal bracket 21 which includes an elongated, generally rectangular base wall 22, provided at its upper edge with a unitary rearwardly and downwardly extending hanger flange 23. The flange 23 is generally in the shape of an inverted U in transverse cross section and is adapted to fit over the upper edge 15 of one of the walls of the tool cabinet 10, as illustrated in FIG. 1. When thus supported on the tool cabinet 10, the base wall 22 will have its rear surface disposed against the adjacent wall of the tool cabinet 10 and may be fixedly secured thereto, as by a fastener 24, receivable through complementary openings in the base wall 22 and in the tool cabinet wall. The bracket 21 is of unitary, one-piece construction and has formed therein, intermediate the upper and lower edges thereof, a forwardly projecting channel 25, which is generally rectangular in transverse cross section and includes a top wall 26, a bottom wall 27 and a front wall 28. The channel 25 extends the entire length of the base wall 22 substantially parallel to the top and bottom edges thereof and is provided in the front wall 28 thereof with a plurality of spaced-apart holes 29.

The hanger assembly 20 also includes one or more hooks 30, each in the form of an elongated metal rod having a straight main shaft 31 with an externally threaded mounting end 32 and an upturned distal end 33 which has a circular aperture 34 formed laterally therethrough. The threaded end 32 of the hook 30 is dimensioned to fit through a selected one of the holes 29 in the bracket 21 and may be secured thereto by means of a lock nut 35 disposed along the front face of the channel front wall 28 and a nut 36 disposed along the rear wall thereof (FIG. 3). Preferably, the hook 30 is mounted so that the rear end thereof does not project rearwardly beyond the base wall 22 of the bracket 21, so as not to contact and scratch the adjacent wall of the tool cabinet 10, in use. It will be appreciated that any number of hanger hooks 30 may be mounted on the bracket 21 in any selected spacing, depending upon the particular application. In the arrangement illustrated in FIGS. 1–3, two of the hanger hooks 30 are illustrated spaced apart a substantial distance to support a relatively large article, as will be explained more fully below.

It is a significant aspect of the invention that the hanger assembly 20 includes an elongated locking pin 40, which has a length at least as great as the spacing between the hanger hooks 30 and is provided with a tapered or pointed insertion end 41, dimensioned to fit through the aperture 34 in an associated one of the hooks 30, as illustrated in FIGS. 1 and 2. The other end of the locking pin 40 is bent to form a circular eyelet 42, dimensioned to receive therethrough the distal end 33 of one of the hanger hooks 30. If desired, a padlock 45 may also be provided of a size so that its shackle will pass through the aperture 34 in a hanger hook 30.

Referring now to FIG. 4, the two-hook arrangement illustrated in FIGS. 1–3 may be utilized to support a relatively large article, such as a creeper 50. The creeper 50 has a rectangular metal frame 51 provided with a plurality of longitudinally spaced-apart lateral cross rails 52, and supports thereon a support pad or platform 53. In use, the hanger hooks 30 are spaced apart a distance so as to respectively fit in the spaces between the pad 53 and the side rails of the frame 51 of the creeper 50. A cross rail 52 of the creeper 50 is hung on the pair of hooks 30, as illustrated in FIG. 4.

In order to lock the creeper 50 in place and prevent removal thereof from the hanger assembly 20, the locking pin 40 is used. More specifically, the insertion end 41 is inserted through the aperture 34 in one of the hooks 30 in a laterally inside-out direction, as illustrated in the drawings, and the eyelet 42 is then looped over the distal end of the other one of the hanger hooks 30. The shackle of the padlock 45 may then be inserted through the aperture 34 of the hook 30 which extends through the locking pin eyelet 42, to prevent removal of the locking pin 40. Thus, it will be appreciated that the locking pin 40 and the padlock 45 cooperate to prevent removal of the creeper 50 from the hanger assembly 20.

As was indicated above, the spacing of the hanger hooks 30 may be altered by mounting them in different ones of the bracket holes 29, to accommodate different sized articles. Thus, referring to FIG. 5, the hanger hooks 30 may be moved more closely together to accommodate a smaller size creeper 55 having cross rails 56, in the same manner as was described in connection with FIG. 4. Some creepers have a flat wooden base or platform instead of an open metal frame.

Referring to FIG. 6, there is illustrated such a wooden creeper 57. In order to mount it on the hanger assembly 20, holes 58 may be drilled through the wooden base of the creeper to accommodate the distal ends of the hooks 30. Otherwise, the use of the hanger assembly 20 would be the same as was described above in connection with FIGS. 4 and 5.

Figure 7:
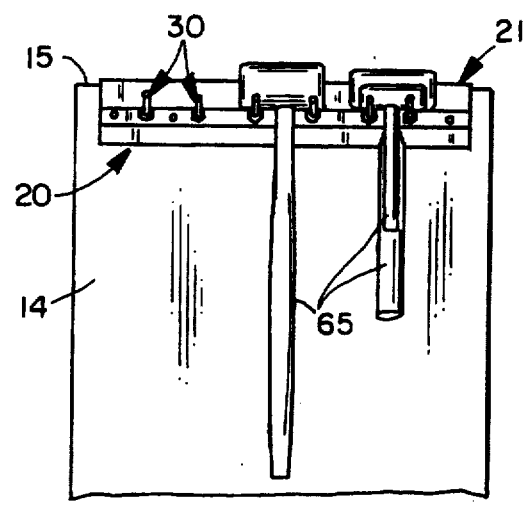
FIG. 7 is a view similar to FIG. 4, illustrating a still further configuration of the hooks of the hanger apparatus for mounting other types of articles.
Figure 8:
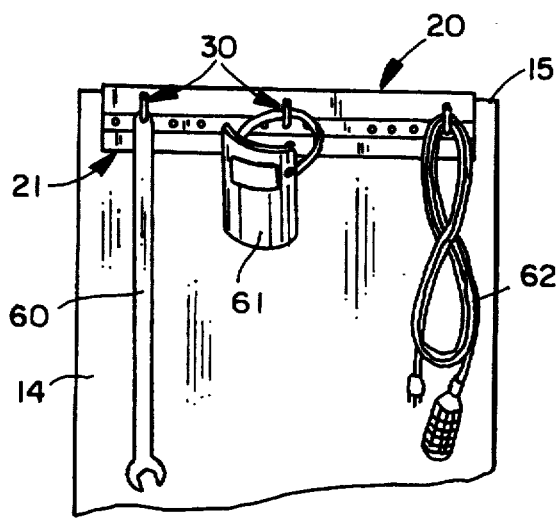
FIG. 8 is a still further view similar to FIG. 4 illustrating another configuration of the hooks.

Referring to FIGS. 7 and 8, there are illustrated alternative arrangements of the hanger hooks 30 on the bracket 21 for accommodating different types of articles. Thus, for example, a large wrench 60 may have a hanging hole at one end thereof which can be fitted over the distal end of one of the hanger hooks 30. Similarly, items such as a welding mask 61, or a coil of cord or cable, such as for a utility light 62, or other types of tubing may be looped over individual ones of the hanger hooks 30, as shown in FIG. 8. Alternatively, the hanger hooks 30 may be arranged in closely-spaced pairs for supporting the heads of handled objects, such as mallets or hammers 65, as illustrated in FIG. 7.

While, in the preferred embodiment, the bracket 21 is provided with a plurality of identically-shaped circular holes 29, it will be appreciated that it could also be provided with elongated slots for continuous adjustment of the positions of the hanger hooks 30.

From the foregoing, it can be seen that there has been provided an improved hanger assembly for supporting accessory articles on a tool cabinet or the like, the hanger assembly being of simple and economical construction and enabling locking of articles thereon.

We claim:

1. A lockable hanger apparatus for hanging associated articles comprising: a support bracket adapted to be mounted on an associated support structure, said bracket including an elongated channel-shaped mounting portion including a front wall and upper and lower walls integral with said front wall respectively along the upper and lower edges thereof and extending rearwardly therefrom for cooperation therewith to define a channel, said front wall having a plurality of openings therein spaced-apart longitudinally thereof and spaced from said upper and lower walls, two spaced-apart hanger members respectively extending through selected ones of the openings in said bracket and projecting therefrom, each of said hanger members terminating in a distal end and having an aperture transversely therethrough adjacent to the distal end thereof, fastening means disposed in said channel securely attaching said hanger members to said bracket, and an elongated rod having a length greater than the distance between said hanger members, said rod defining at one end thereof an insertion portion dimensioned to be received through the aperture in one of said hanger members, said rod including means at the other end thereof defining a passage therethrough dimensioned for receiving therethrough the distal end of the other one of said hanger members when said insertion portion is received through the aperture in said one hanger member, whereby said rod cooperates with said hanger members and said bracket for retaining on said hanger members articles hanging therefrom.

2. The hanger apparatus of claim 1, wherein said bracket includes a flat rectangular base plate, said mounting portion comprising said channel formed in said base plate and extending the length thereof and being substantially rectangular in transverse cross section.

3. The hanger apparatus of claim 1, wherein said support bracket is of unitary one-piece construction.

4. The hanger apparatus of claim 3, wherein said bracket includes a generally channel-shaped support flange adapted to be hooked on the associated support structure for hanging said bracket thereon.

5. The hanger apparatus of claim 4, and further comprising fastening means for securing said bracket to the associated support structure.

6. The hanger apparatus of claim 1, wherein said rod is of unitary one-piece construction.

7. The hanger apparatus of claim 6, wherein said rod is bent at said other end thereof to form an eyelet defining said passage.

8. The hanger apparatus of claim 1, wherein said base has a plurality of openings formed therein, each of said hanger members having a threaded end receivable through a corresponding one of said openings, and further including threaded fastener means for securing said hanger members in said openings.

9. A lockable hanger apparatus for hanging associated articles comprising: a base, two spaced-apart hanger members carried by said base, each of said hanger members projecting from said base and terminating in a distal end and each having an aperture transversely therethrough adjacent to the distal end thereof, an elongated rod of unitary one-piece construction having a length greater than the distance between said hanger members, said rod defining at one end thereof an insertion portion dimensioned to be received through the aperture in one of said hanger members, said rod including means at the other end thereof defining a passage dimensioned for receiving therethrough the distal end of the other one of said hanger members when said insertion portion is received through the aperture in said one hanger member, and fastening means for securely attaching each of said hanger members to said base, whereby said rod cooperates with said hanger members and said base for retaining on said hanger members articles hanging therefrom.

10. The hanger apparatus of claim 9, wherein said rod is bent at said other end thereof to form an eyelet defining said passage.

11. The hanger assembly of claim 9, wherein said base includes means for mounting said hanger members thereon at variable locations thereon.

12. The hanger apparatus of claim 9, wherein said base has a plurality of openings formed therein, each of said hanger members having a threaded end receivable through a corresponding one of said openings, and further including threaded fastener means for securing said hanger members in said openings.

* * * * *